United States Patent [19]

Jones

[11] 4,369,679

[45] Jan. 25, 1983

[54] PORTABLE ROTARY MACHINING DEVICE

[76] Inventor: Norman E. Jones, Box 124, Tracyton, Wash. 98393

[21] Appl. No.: 206,207

[22] Filed: Nov. 12, 1980

[51] Int. Cl.³ .............................................. B23B 3/24
[52] U.S. Cl. ...................................... 82/4 R; 82/4 C
[58] Field of Search .................................. 82/4 C, 4 R

[56] References Cited

U.S. PATENT DOCUMENTS

| | | | |
|---|---|---|---|
| 3,078,749 | 2/1963 | Maxner et al. | 82/4 R |
| 3,818,786 | 6/1974 | Leshem | 82/4 C |
| 4,236,428 | 12/1980 | Feamster | 82/4 C |

*Primary Examiner*—Leonidas Vlachos

*Attorney, Agent, or Firm*—R. S. Sciascia; Charles D. B. Curry

[57] ABSTRACT

A portable machining device that is particularly useful for removing excess peripheral weld from the flat surface of welded-in valves such as breech lock gate valves. The portable machining device includes a housing, a cutting tool, a vertical feed mechanism, a horizontal feed mechanism, and a rotation drive mechanism. The vertical feed and rotation drive mechanisms have central openings for receiving the upward extending valve stem from the surface to be machined. The base of the housing is ring shaped and includes slots for attachment to the flat surface of the valve. In operation, the cutting tool is rotated and fed vertically and horizontally to machine the excess weld to be flush with the flat surface.

4 Claims, 6 Drawing Figures

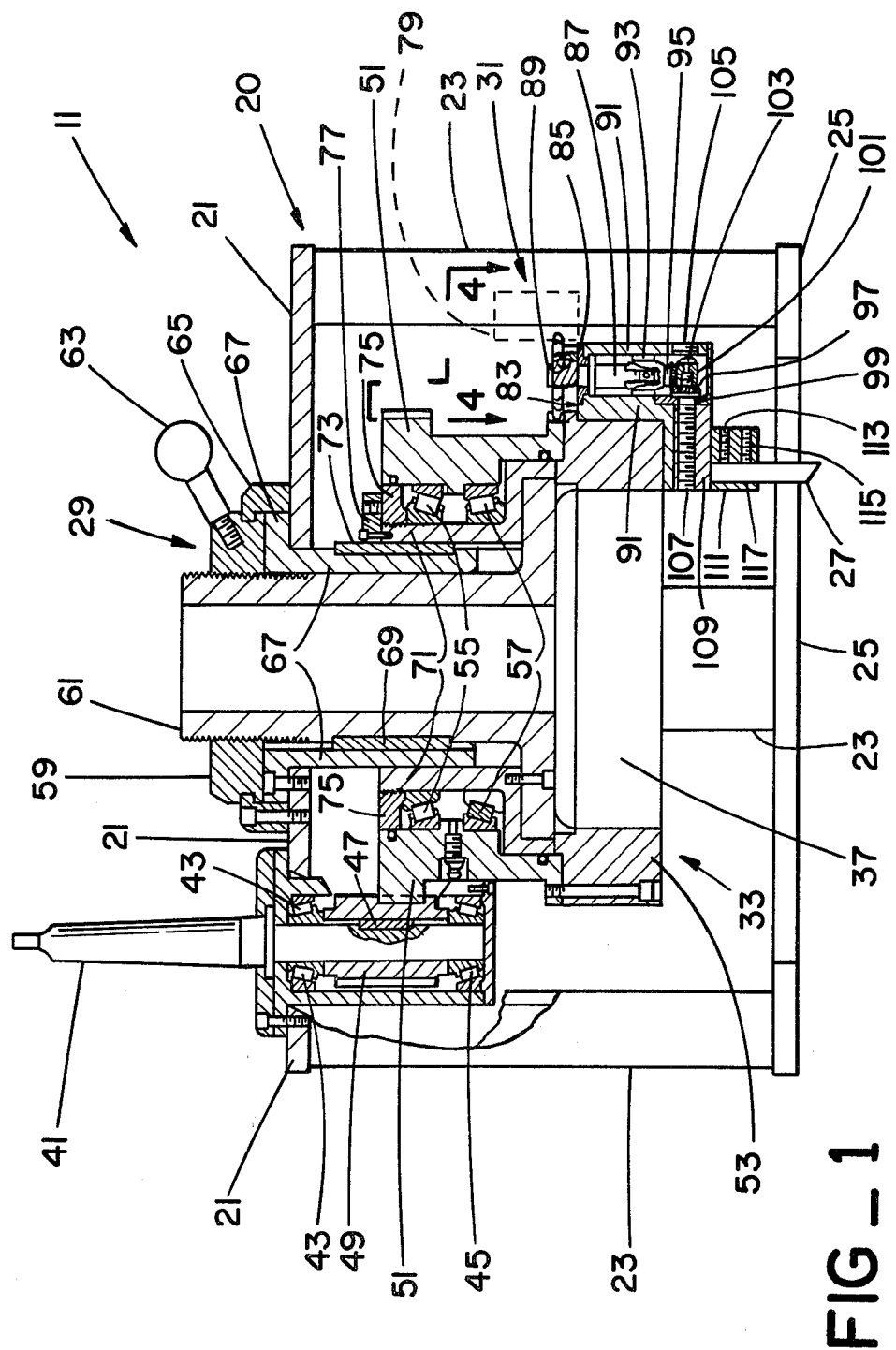
FIG_1

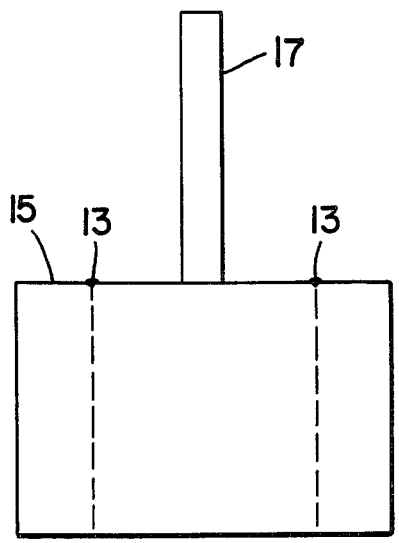
FIG_2A
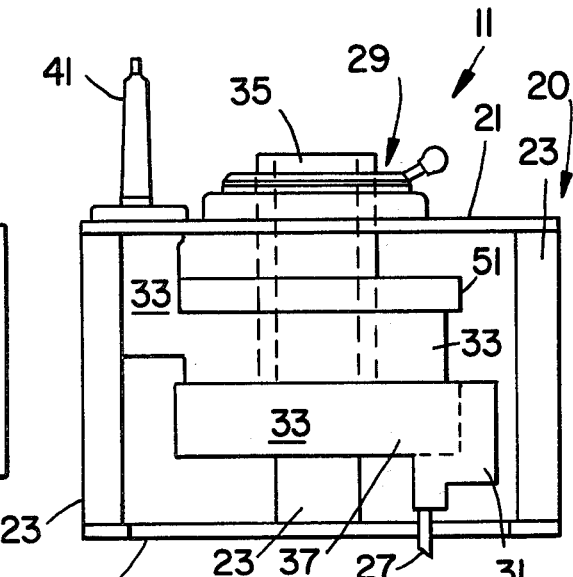
FIG_3A
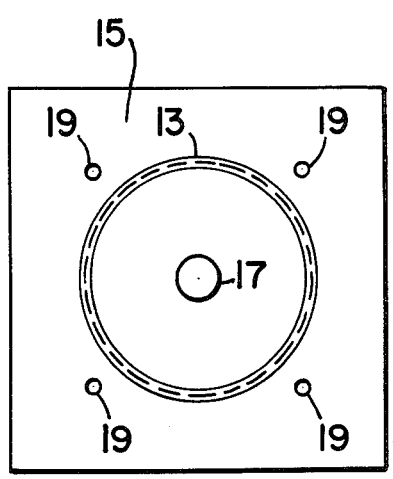
FIG_2B
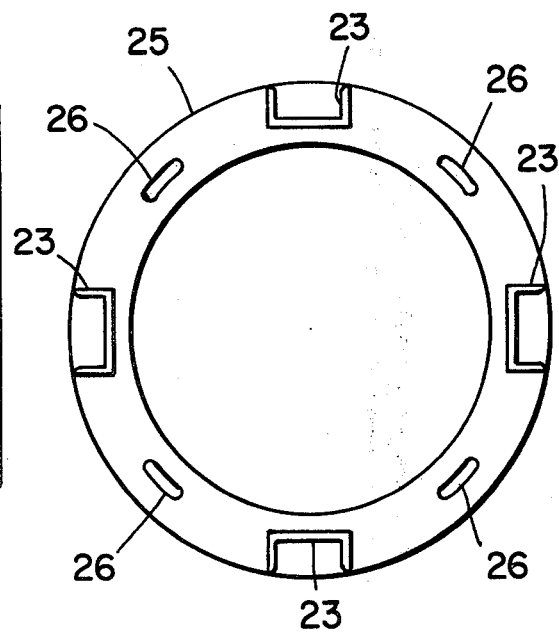
FIG_3B

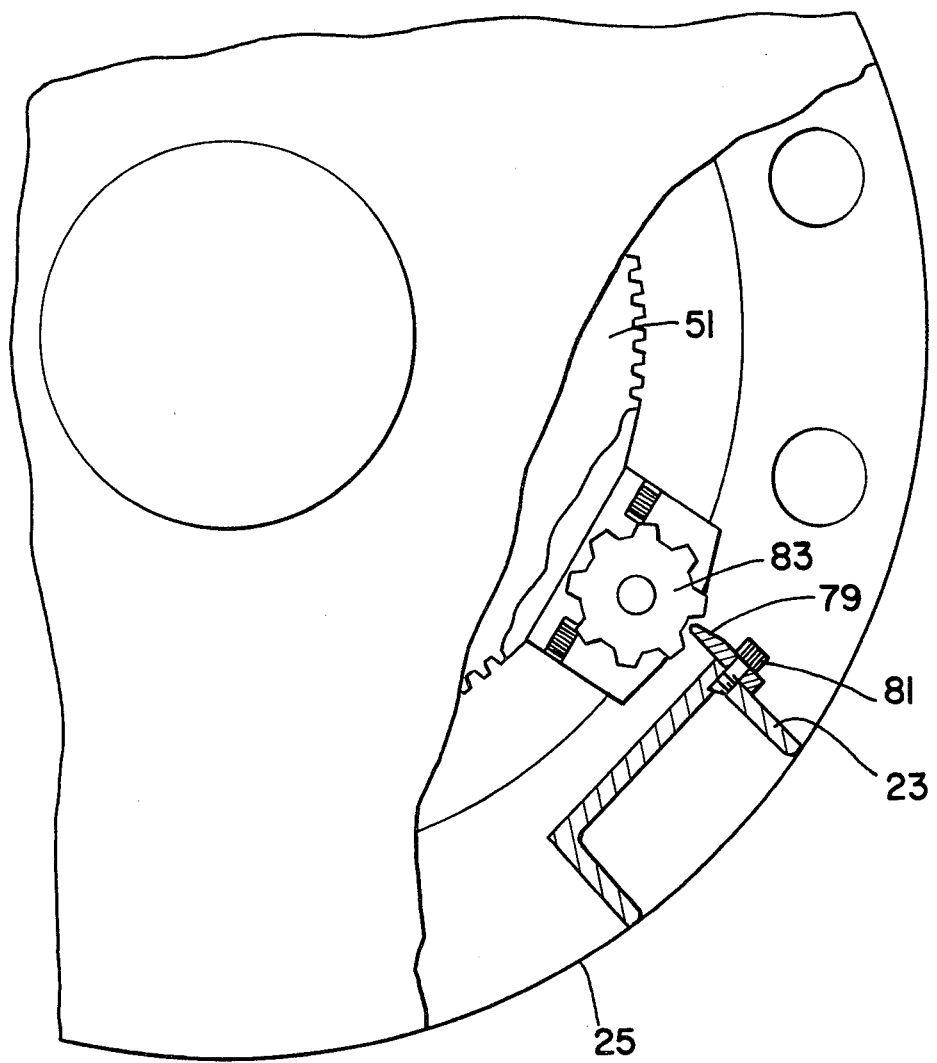
FIG_4

PORTABLE ROTARY MACHINING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a rotary machining device and more particularly to a portable rotary machining device that may be used to machine the excess weld from welded-in valves such as breech lock gate valves.

2. Description of the Prior Art

The assembly of breech lock gate valves involves the welding in place of certain components which results in a circular peripheral weld bead, some of which extends above the flat valve body surface that surrounds an upwardly extending valve stem. The valve is constructed such that the seal is welded to the bonnet and the bonnet is welded to the body. To complete the valve assembly it is necessary to remove the excess peripheral weld bead to be flush with the flat surface. It is often necessary to perform this operation while the valve is still installed in the system and located in rather inaccessible places, especially on board ship.

Former methods utilized a carbon arc or a high speed grinder to machine flush welded-in breech lock valves. The primary disadvantages with these techniques are that the high heat content from the carbon arc often results in warpage and a grinder is time consuming and constitutes a safety hazard especially on large valves. Moreover, after using the techniques it is still often necessary to remove the valve from the system for further machining.

The present invention overcomes these disadvantages by providing a portable machining device that rapidly, effectively and with minimal safety hazard, removes the excess peripheral said from welded-in valves such as breech lock gate valves.

SUMMARY OF THE INVENTION

Briefly, the present invention relates to a portable machining device that is particularly useful for removing excess peripheral weld from the flat surface of welded-in valves such as breech lock gate valves. The portable machining device includes a housing, a cutting tool, a vertical feed mechanism, a horizontal feed mechanism, and a rotation drive mechanism. The vertical feed and rotation drive mechanisms have central openings for receiving the upward extending valve stem from the surface to be machined. The base of the housing is ring shaped and includes slots for attachment to the flat surface of the valve. In operation, the cutting tool is rotated and fed vertically and horizontally to machine the excess weld to be flush with the flat surface.

STATEMENT OF THE OBJECTS OF THE INVENTION

An object of the present invention is to provide a portable machining device that is safe and effective.

Another object of the present invention is to provide a portable machining device that removes the excess peripheral weld from welded-in valves such as breech lock gate valves.

Still another object of the present invention is to provide a machining device that has an open central region and a cutting tool that has horizontal and vertical feed and is rotated about the central opening.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a detailed side elevation sectional view of the present invention;

FIGS. 2A and 2B are side and top elevation views of a typical breech lock gate valve that is to be machined by the present invention;

FIGS. 3A and 3B are diagrammatic side and bottom elevation views showing the main features of the machining device of the present invention; and FIG. 4 is a top elevation view of the horizontal feed mechanism taken at section 4—4 of FIG. 1.

DESCRIPTION OF THE PREFERRED EMBODIMENT

In FIG. 1 is shown a detailed side elevation sectional view of the machining device 11 of the present invention. This is a portable machining device that may be used to machine, in place, welded-in valves such as breech lock gate valves.

In FIGS. 2A and 2B is shown a typical breech lock gate valve that is to be machined by machining device 11. Weld 13 is circular in shape and has excess weld that extends above a plane flat body surface 15 of the valve. Also a stem 17 extends upward from surface 15 and is part of the valve mechanism, not shown. Outside of weld 13 the flat surface 15 of the valve has four threaded openings 19 for mating with another part of the valve section, not shown.

Referring to FIGS. 1, 3A and 3B machining device 11 includes a housing 20 (comprising top plate 21, legs 23, base 25), cutting tool 27, vertical feed mechanism 29, horizontal feed mechanism 31, and rotation drive mechanism 33. The vertical feed mechanism 29, rotation drive mechanism 33, top plate 21 and base 25 have central openings. The openings receive stem 17 when the machining device is mounted on flat surface 15 of FIGS. 2A and 2B. Base 25 is ring shaped and includes slots 26 for receiving bolts, not shown, that engage threaded openings 19 of FIG. 2B when the machining device is mounted on surface 15. In operation, cutting tool 27 is rotated and fed vertically in order to machine weld 13 flush with surface 15 as hereinafter explained in detail.

Referring to FIG. 1, rotation drive mechanism 33 includes an input shaft 41 mounted on tapered roller bearings 43 and 45, and is keyed by key 47 to elongated pinion gear 49. Pinion gear 49 rotates spur gear ring 51 which, in turn, drives the attached column feed retainer 53. The spur gear ring 51 is mounted on tapered roller bearings 55 and 57 and rotate about the vertical feed mechanism 29. The vertical feed mechanism 29 is attached to the machine housing 20. It cannot rotate but can move vertically to impart vertical motion to the horizontal feed mechanism 31 and cutting tool 27. The vertical feed mechanism 29 includes feed cut 59, vertical feed column 61, handle 63, split ring 65, column guide 67, key 69 (for connecting column 61 and guide 67), main bearing housing 71, key 73 (for connecting guide 67 and housing 71), retainer ring 75 and retainer ring stop 77.

Referring to FIGS. 1 and 4, the horizontal feed mechanism 31 includes activating plate 79, cap screw 81 that connects plate 79 to leg 23, starwheel 83, bushing 85, shaft 87, key 89 (for connecting starwheel 83 to shaft 87), housing 91, bushing 93, pinion 95, gear 97, bushing 99, keeper nut 101, button 103, set screw 105, leadscrew 107, dovetail slide 109 and tool holder 111. Tool holder 111 includes a male dovetail that has female threads. The male dovetail engages the dovetail slide 109 and the female threads engage leadscrew 107. Tool holder includes set screws 113 and 115 to hold tool 27 rigidly in tool slot 117.

OPERATION

The machining device 11 of the present invention has three primary operations wich are: (1) vertical feed, (2) rotation and (3) horizontal feed.

Vertical feed:

Vertical feed is achieved by rotation of feed nut 59 by handle 63 in either the clockwise or counterclockwise direction for raising or lowering the mechanisms. Feed nut 59 is vertically fixed with respect to top plate 21 but is allowed to rotate by slip ring 65. When rotated in one direction the threads of feed nut 59 engage the threads of vertical feed column 61 and cause it to move vertically. Guide 67 and housing 71 have full length slots to respectively permit keys 69 and 73 to slide with respect thereto. Horizontal feed 31 will be allowed to move vertically since activating plate 79 is elongated which permits its interaction with starwheel 83 throughout the entire vertical movement range. In like manner pinion gear 49 is elongated which permits spur gear ring 51 to move vertically throughout the entire vertical movement range and still remain in engagement with pinion gear 49. All of the elements within housing 20 (cutting tool 27, vertical feed mechanism 29, horizontal feed mechanism 31 and rotation drive mechanism 33) move vertically, with the exception of column guide 67, key 73, activating 79 and that part of rotation drive mechanism 33 that is driving or supporting pinion gear 49.

Rotation:

Rotation of input shaft 41 causes rotation of pinion gear 49 which causes rotation of spur gear ring 51. Ring 51 is rigidly connected to column feed retainer 53 and also rigidly supports horizontal feed mechanism 31. Rotation of ring 51 with respect to vertical feed column 61 is permitted by bearings 55 and 57. In this manner tool 27 is caused to rotate.

Horizontal Feed:

Horizontal feed is achieved by rotating starwheel 83 in either direction. This is achieved since the starwheel is being rotated one notch by activating plate 39 upon each revolution of spur gear ring 51 and horizontal feed mechanism 31.

In summary, the machine housing assembly is bolted to the valve body. Centering is accomplished by inserting a bushing of proper size between the valve stem and the inside of the feed column. A reversible air motor is attached to a bracket and to the input shaft. Torque is applied through the pinion and ring gear to rotate the tool bit for cutting. A plate on the machine housing leg engages the starwheel drive and automatically advances (or withdraws) the tool bit horizontally 0.10 inches each revolution of the cutting process. Vertical feed is accomplished by manual rotation of the feed nut. The device has a tool bit feed range of about 8 inches horizontally and 6 inches vertically.

What is claimed is:

1. A rotary machining device comprising:
   (a) a housing, a cutting tool, a vertical feed mechanism, a horizontal feed mechanism and a rotation drive mechanism;
   (b) said vertical feed mechanism, said horizontal feed mechanism and said rotation drive mechanism mounted on and within said housing;
   (c) said cutting tool mounted on said horizontal feed mechanism for imparting horizontal movement to said cutting tool;
   (d) said vertical feed mechanism centrally mounted within said housing and supporting said horizontal feed mechanism for imparting vertical movement thereto;
   (e) said rotational drive mechanism mounted on said periphery of said housing and operatively connected to said horizontal feed mechanism for imparting rotational movement thereto;
   (f) whereby said cutting tool may be moved vertically, horizontally and rotationally to make circular cuts in material that is positioned outside of said housing;
   (g) said housing includes a top plate, a base and legs;
   (h) said top plate having a central opening, said base having a central opening and said legs interconnecting said top plate and said plate in a spaced apart relationship;
   (i) said vertical feed mechanism includes a feed nut, and a vertical feed column;
   (j) said vertical feed column having a central opening;
   (k) said feed nut and said vertical feed column being in threaded engagement whereby rotation of said feed nut in one direction raises said vertical feed column and rotation in the other direction lowers said vertical feed column;
   (l) said vertical feed mechanism includes a slip ring, said slip ring mounted on said top plate for rotationally supporting said feed nut; and
   (m) said vertical feed mechanism includes a column guide, said column guide being mounted on said top plate and extending into said housing and including a central opening for supporting said vertical feed column.

2. The device of claim 1 wherein:
   (a) said vertical feed mechanism includes a bearing housing, said bearing housing being supported by said vertical feed mechanism; and
   (b) bearings positioned between said bearing housing and said gear ring for rotationally and vertically supporting said gear ring.

3. The device of claim 2 wherein:
   (a) said vertical feed mechanism includes a first key; and
   (b) said first key is positioned between said vertical feed column and said column guide to prevent relative rotation motion and to permit relative sliding motion.

4. The device of claim 3 wherein:
   (a) said vertical feed mechanism includes a second key; and
   (b) said second key is positioned between said column guide and bearing housing to prevent relative rotation motion and to permit relative sliding motion.

* * * * *